(12) United States Patent
Ito

(10) Patent No.: US 8,749,846 B2
(45) Date of Patent: Jun. 10, 2014

(54) IMAGE READING DEVICE, IMAGE READING METHOD, AND IMAGE FORMING APPARATUS

(75) Inventor: Masao Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 78 days.

(21) Appl. No.: 13/619,339

(22) Filed: Sep. 14, 2012

(65) Prior Publication Data

US 2013/0258364 A1 Oct. 3, 2013

(30) Foreign Application Priority Data

Mar. 29, 2012 (JP) .................................. 2012-075442

(51) Int. Cl.
*H04N 1/60* (2006.01)
*H04N 1/46* (2006.01)

(52) U.S. Cl.
USPC ............ 358/1.9; 358/406; 358/504; 358/523; 358/524

(58) Field of Classification Search
None
See application file for complete search history.

(56) References Cited

U.S. PATENT DOCUMENTS

| | | | | |
|---|---|---|---|---|
| 5,481,380 A | * | 1/1996 | Bestmann | ...................... 358/504 |
| 6,141,120 A | * | 10/2000 | Falk | .............................. 358/504 |
| 6,671,067 B1 | * | 12/2003 | Adam et al. | .................... 358/1.6 |
| 6,952,494 B2 | * | 10/2005 | Odagiri et al. | ................. 358/1.9 |
| 7,414,752 B2 | * | 8/2008 | Adam et al. | .................... 358/1.9 |
| 2003/0038954 A1 | * | 2/2003 | Odagiri et al. | ................. 358/1.9 |
| 2004/0130739 A1 | * | 7/2004 | Adam et al. | .................... 358/1.9 |
| 2011/0051204 A1 | | 3/2011 | Kawano et al. | |

FOREIGN PATENT DOCUMENTS

| | | |
|---|---|---|
| JP | 02-199964 A | 8/1990 |
| JP | 04-227371 A | 8/1992 |
| JP | 06-309423 A | 11/1994 |
| JP | 08-321963 A | 12/1996 |

OTHER PUBLICATIONS

Office Action issued by the Australian Patent Office in corresponding Patent Application No. 2012232981 dated Oct. 23, 2013.

* cited by examiner

*Primary Examiner* — Kimberly A Williams
(74) *Attorney, Agent, or Firm* — Sughrue Mion, PLLC

(57) ABSTRACT

An image reading device includes a first reader member that receives light from a medium to read an image recorded on a surface thereof; a second reader member that separates the light from the medium and reads a color of the recorded image based on the separated light; a deriving unit that derives associating information that associates a first read result with a second read result based on the first read result and the second read result, the first read result being obtained by the first reader member, the second read result being obtained by the second reader member; and a measuring unit that measures the color of the image on the medium for performing color calibration by reading the medium by using the first reader member so as to determine a color corresponding to the second read result based on the first read result and the associating information.

8 Claims, 11 Drawing Sheets

IMAGE READING DEVICE, IMAGE READING METHOD, AND IMAGE FORMING APPARATUS

CROSS-REFERENCE TO RELATED APPLICATIONS

This application is based on and claims priority under 35 USC 119 from Japanese Patent Application No. 2012-075442 filed Mar. 29, 2012.

BACKGROUND

Technical Field

The present invention relates to image reading devices, image reading methods, and image forming apparatuses.

SUMMARY

According to an aspect of the invention, there is provided an image reading device including a first reader member, a second reader member, a deriving unit, and a measuring unit. The first reader member receives light from a medium so as to read an image recorded on a surface of the medium. The second reader member has a spectroscope that separates the light from the medium and reads a color of the image recorded on the surface of the medium on the basis of the separated light. The deriving unit derives associating information that associates a first read result with a second read result on the basis of the first read result and the second read result. The first read result is obtained by the first reader member reading the medium having the image with a predetermined color recorded thereon. The second read result is obtained by the second reader member reading the medium. When the color of the image on the medium is to be measured for performing color calibration, the measuring unit measures the color by reading the medium by using the first reader member so as to determine a color corresponding to the second read result on the basis of the first read result and the associating information.

BRIEF DESCRIPTION OF THE DRAWINGS

An exemplary embodiment of the present invention will be described in detail based on the following figures, wherein.

DETAILED DESCRIPTION

Figure 1:
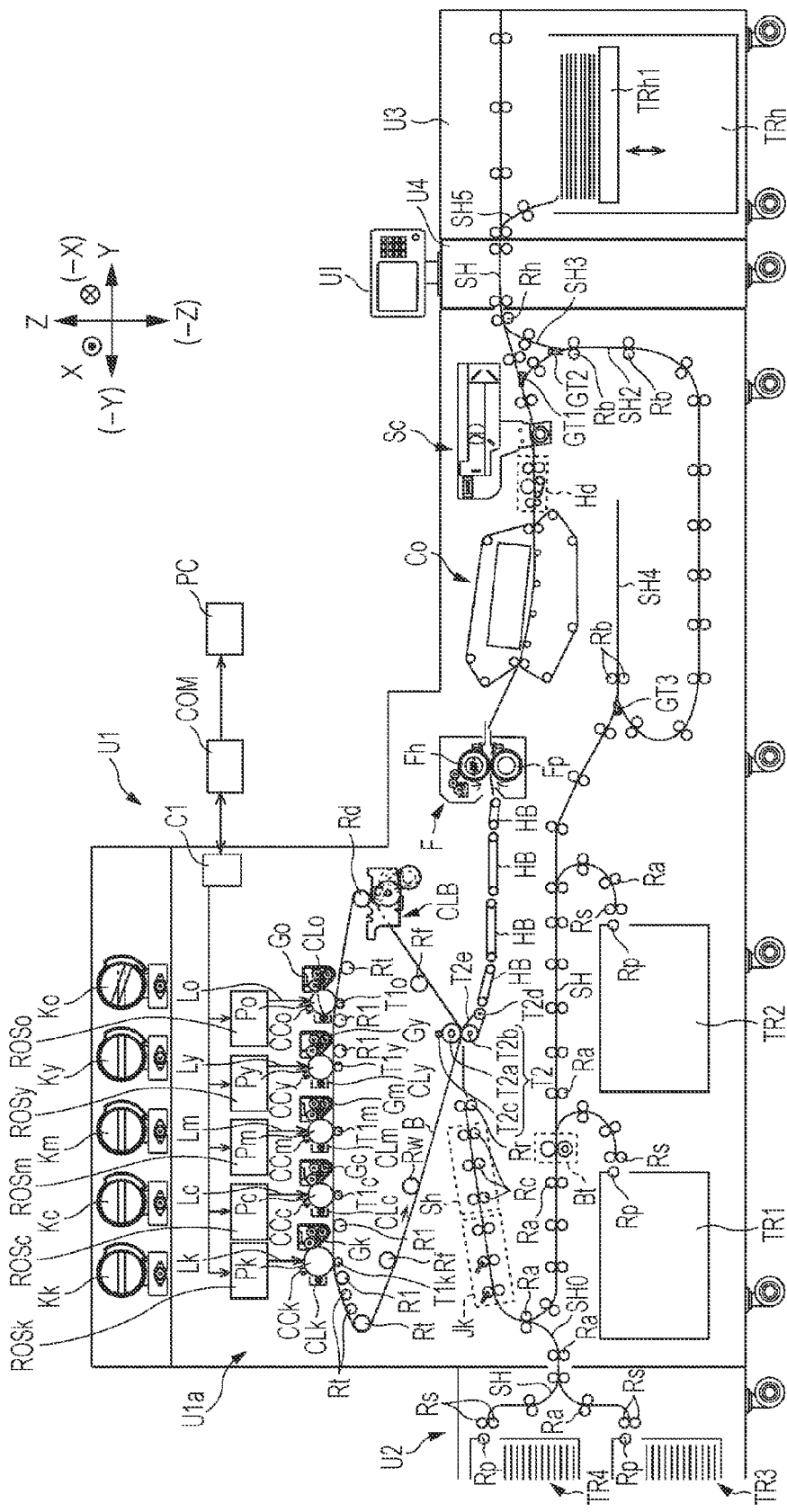
FIG. 1 is an overall view of an image forming apparatus according to a first exemplary embodiment of the present invention.

Although an exemplary embodiment of the present invention will be described in detail below with reference to the drawings, the present invention is not to be limited to the following exemplary embodiment.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

Overall Configuration of Printer U According to First Exemplary Embodiment

FIG. 1 is an overall view of an image forming apparatus according to a first exemplary embodiment of the present invention.

Figure 2:
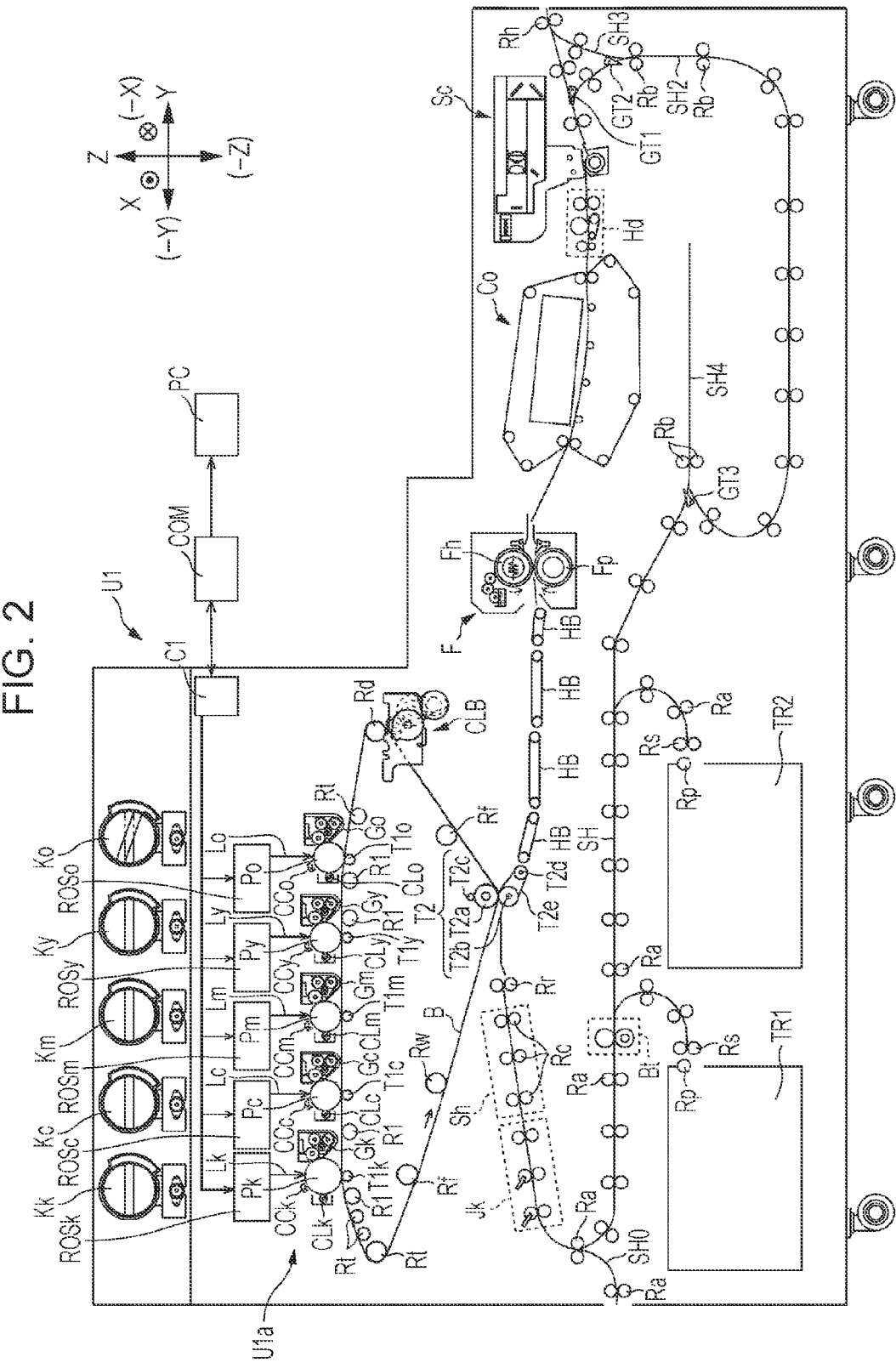
FIG. 2 illustrates a relevant part of the image forming apparatus according to the first exemplary embodiment of the present invention.

FIG. 2 illustrates a relevant part of the image forming apparatus according to the first exemplary embodiment of the present invention.

Referring to FIGS. 1 and 2, a printer U as an example of an image forming apparatus according to the first exemplary embodiment includes an image forming apparatus body U1, a feeder unit U2 as an example of a feeding device that feeds a medium to the image forming apparatus body U1, an output unit U3 as an example of an output device to which a medium having an image recorded thereon is output, an interface module U4 as an example of a connector that connects the body U1 and the output unit U3, and an operable unit UI operable by a user.

Configuration of Marking Unit in First Exemplary Embodiment

Referring to FIGS. 1 and 2, the image forming apparatus body U1 includes a controller C1 that controls the printer U, a communicator (not shown) that receives image information transmitted from a print image server COM as an example of an information transmitter externally connected to the printer U via a dedicated cable (not shown), and a marking unit U1a as an example of an image recorder that records an image onto a medium. The print image server COM is connected, via a line such as a cable or a local area network (LAN), to a personal computer PC as an example of an image transmitter that transmits information of an image to be printed in the printer U.

The marking unit U1a includes photoconductor drums Py, Pm, Pc, and Pk as an example of image bearing members for yellow (Y), magenta (M), cyan (C), and black (K) colors, and a photoconductor drum Po for giving glossiness to an image if the image to be printed is a photographic image or the like. The photoconductor drums Py to Po have photoconductive dielectric surfaces.

Referring to FIGS. 1 and 2, in the rotational direction of the photoconductor drum Pk for the black color, a charger CCk, an exposure unit ROSk as an example of a latent-image forming unit, a developing unit Gk, a first-transfer roller T1k as an example of a first-transfer unit, and a photoconductor cleaner CLk as an example of an image-bearing-member cleaner are arranged around the photoconductor drum Pk.

Likewise, chargers CCy, CCm, CCc, and CCo, exposure units ROSy, ROSm, ROSc, and ROSo, developing units Gy, Gm, Gc, and Go, first-transfer rollers T1y, T1m, T1c, and T1o, and photoconductor cleaners CLy, CLm, CLc, and CLo are respectively arranged around the remaining photoconductor drums Py, Pm, Pc, and Po.

Toner cartridges Ky, Km, Kc, Kk, and Ko as an example of containers that accommodate therein developers to be supplied to the developing units Gy to Go are detachably supported above the marking unit U1a.

An intermediate transfer belt B as an example of an intermediate transfer body is disposed below the photoconductor drums Py to Po. The intermediate transfer belt B is interposed between the photoconductor drums Py to Po and the first-transfer rollers T1y to T1o. The undersurface of the intermediate transfer belt B is supported by a drive roller Rd as an example of a drive member, a tension roller Rt as an example of a tension applying member, a working roller Rw as an example of a meander prevention member, multiple idler rollers Rf as an example of driven members, a backup roller T2a as an example of a second-transfer opposing member, multiple retracting rollers R1 as an example of movable members, and the aforementioned first-transfer rollers T1y to T1o.

A belt cleaner CLB as an example of an intermediate-transfer-body cleaner is disposed on the top surface of the intermediate transfer belt B near the drive roller Rd.

A second-transfer roller T2b as an example of a second-transfer member is disposed facing the backup roller T2a with the intermediate transfer belt B interposed therebetween. The backup roller T2a is in contact with a contact roller T2c as an example of a contact member for applying a voltage having a reversed polarity relative to the charge polarity of the developers to the backup roller T2a. In the first exemplary embodiment, a transport belt T2e as an example of a transport member is bridged between the second-transfer roller T2b and a drive roller T2d as an example of a drive member disposed at the lower right side thereof.

The backup roller T2a, the second-transfer roller T2b, and the contact roller T2c constitute a second-transfer unit T2 according to the first exemplary embodiment. The first-transfer rollers T1y to T1o, the intermediate transfer belt B, the second-transfer unit T2, and the like constitute a transfer device T1+B+T2 according to the first exemplary embodiment.

Feed trays TR1 and TR2 as an example of containers that accommodate therein recording sheets S as an example of media are provided below the second-transfer unit T2. A pickup roller Rp as an example of a fetching member and a separating roller Rs as an example of a separating member are disposed at the upper right side of each of the feed trays TR1 and TR2. A transport path SH that transports each recording sheet S extends from the separating roller Rs. Multiple transport rollers Ra as an example of transport members that transport each recording sheet S downstream are arranged along the transport path SH.

A deburring unit Bt as an example of an unwanted-part remover is disposed at the downstream side, in the transport direction of each recording sheet S, of a merging point of the transport paths SH from the two feed trays TR1 and TR2. Specifically, the deburring unit Bt performs so-called deburring by transporting each recording sheet S downstream while nipping the recording sheet S with a predetermined pressure so as to remove an unwanted part from an edge of the recording sheet S.

A multi-feed detector Jk is disposed at the downstream side of the deburring unit Bt and detects whether a stack of multiple recording sheets S are multi-fed by measuring the thickness of the recording sheet or sheets S traveling therethrough. Correcting rollers Rc as an example of an orientation correcting unit that corrects a so-called skew, i.e., inclination, of each recording sheet S relative to the transport direction thereof are disposed at the downstream side of the multi-feed detector Jk. A registration roller Rr as an example of an adjusting member that adjusts the timing for transporting each recording sheet S toward the second-transfer unit T2 is disposed at the downstream side of the correcting rollers Rc.

The feeder unit U2 is similarly provided with components, such as feed trays TR3 and TR4, which have configurations similar to those of the feed trays TR1 and TR2, the pickup rollers Rp, the separating rollers Rs, and the transport rollers Ra. A transport path SH from the feed trays TR3 and TR4 merges with the transport path SH in the image forming apparatus body U1 at the upstream side of the multi-feed detector Jk.

Multiple transport belts HB that support each recording sheet S on the surfaces thereof so as to transport the recording sheet S downstream are arranged at the downstream side of the transport belt T2e in the transport direction of the recording sheet S.

A fixing device F is disposed at the downstream side of the transport belts HB in the transport direction of the recording sheet S.

A cooling device Co that cools the recording sheet S is disposed at the downstream side of the fixing device F.

A decurler Hd as an example of a bent-medium corrector that corrects a so-called curl, i.e., bending, of the recording sheet S by applying pressure to the recording sheet S is disposed at the downstream side of the cooling device Co.

An image reading device Sc that reads an image recorded on the recording sheet S is disposed at the downstream side of the decurler Hd.

An inversion path SH2 as an example of a transport path that diverges from the transport path SH extending toward the interface module U4 is formed at the downstream side of the image reading device Sc. A first gate GT1 as an example of a transport-direction switching member is disposed at the diverging point of the inversion path SH2.

Multiple switchback rollers Rb as an example of transport members that are rotatable in forward and reverse directions are arranged along the inversion path SH2. A connection path SH3 as an example of a transport path that diverges from an upstream section of the inversion path SH2 and merges with the transport path SH at the downstream side of the diverging point of the inversion path SH2 is formed at the upstream side of the switchback rollers Rb. A second gate GT2 as an example of a transport-direction switching member is disposed at the diverging point between the inversion path SH2 and the connection path SH3.

At the downstream side of the inversion path SH2, a switchback path SH4 for performing so-called switchback by reversing the transport direction of the recording sheet S is disposed below the cooling device Co. A switchback roller Rb as an example of a transport member that is rotatable in forward and reverse directions is disposed in the switchback path SH4. A third gate GT3 as an example of a transport-direction switching member is disposed at an inlet of the switchback path SH4.

The transport path SH at the downstream side of the switchback path SH4 merges with the transport path SH for each of the feed trays TR1 and TR2.

In the interface module U4, the transport path SH extends toward the output unit U3.

In the output unit U3, a stacker tray TRh as an example of a container on which output recording sheets S are stacked is disposed, and an output path SH5 diverging from the transport path SH extends toward the stacker tray TRh. The transport path SH in the first exemplary embodiment is configured such that, when an additional output unit (not shown) or an additional post-processing unit (not shown) is attached to the right side of the output unit U3, the transport path SH is capable of transporting the recording sheet S to the added unit.

Operation of Marking Unit

When the printer U receives image information transmitted from the personal computer PC via the print image server COM, the printer U commences a job, which is an image forming operation. When the job commences, the photoconductor drums Py to Po, the intermediate transfer belt B, and the like rotate.

The photoconductor drums Py to Po are rotationally driven by a drive source (not shown).

The chargers CCy to CCo receive a predetermined voltage so as to charge the surfaces of the photoconductor drums Py to Po.

The exposure units ROSy to ROSo output laser beams Ly, Lm, Lc, Lk, and Lo as an example of latent-image write-in light in accordance with a control signal from the controller C1 so as to write electrostatic latent images onto the charged surfaces of the photoconductor drums Py to Po.

The developing units Gy to Go develop the electrostatic latent images on the surfaces of the photoconductor drums Py to Po into visible images.

The toner cartridges Ky to Ko supply the developers as the developers are consumed in the developing process performed in the developing units Gy to Go.

The first-transfer rollers T1y to T1o receive a first-transfer voltage with a reversed polarity relative to the charge polarity of the developers so as to transfer the visible images on the surfaces of the photoconductor drums Py to Po onto the surface of the intermediate transfer belt B.

The photoconductor cleaners CLy to CLo clean the surfaces of the photoconductor drums Py to Po after the first-transfer process by removing residual developers therefrom.

When the intermediate transfer belt B passes through first-transfer regions facing the photoconductor drums Py to Po, O, Y, M, C, and K images are transferred and superposed on the intermediate transfer belt B in that order, and the intermediate transfer belt B subsequently travels through a second-transfer region facing the second-transfer unit T2. When a monochrome image is to be formed, an image of a single color is transferred onto the intermediate transfer belt B and is transported to the second-transfer region.

In accordance with the size of the received image information, the designated type of recording sheets S, and the sizes and types of accommodated recording sheets S, one of the pickup rollers Rp feeds recording sheets S from the corresponding one of the feed trays TR1 to TR4 from which the recording sheets S are to be fed.

The corresponding separating roller Rs separates the recording sheets S fed by the pickup roller Rp in a one-by-one fashion.

The deburring unit Bt deburrs each recording sheet S passing therethrough by applying a predetermined pressure thereto.

The multi-feed detector Jk detects the thickness of recording sheet or sheets S passing therethrough so as to detect whether or not multiple sheets S are fed.

The correcting rollers Rc correct a skew of each recording sheet S passing therethrough by bringing the recording sheet S into contact with a wall surface (not shown).

The registration roller Rr feeds the recording sheet S in accordance with a timing at which the image on the surface of the intermediate transfer belt B is transported to the second-transfer region.

In the second-transfer unit T2, a predetermined second-transfer voltage having the same polarity as the charge polarity of the developers is applied to the backup roller T2a via the contact roller T2c so that the image on the intermediate transfer belt B is transferred onto the recording sheet S.

The belt cleaner CLB cleans the surface of the intermediate transfer belt B after the image transfer process performed at the second-transfer region by removing residual developers therefrom.

After the image is transferred onto the recording sheet S by the second-transfer unit T2, the transport belts T2e and HB transport the recording sheet S downstream while supporting the recording sheet S on the surfaces thereof.

The fixing device F includes a heating roller Fh as an example of a heating member and a pressing roller Fp as an example of a pressing member. The heating roller Fh accommodates therein a heater as an example of a heat source. The fixing device F heats and presses the recording sheet S passing through a region where the heating roller Fh and the pressing roller Fp are in contact with each other so as to fix an unfixed image onto the surface of the recording sheet S.

The cooling device Co cools the recording sheet S heated by the fixing device F.

The decurler Hd applies pressure to the recording sheet S having passed through the cooling device Co so as to decurl the recording sheet S, that is, to remove bending therefrom.

The image reading device Sc reads the image from the surface of the recording sheet S having passed through the decurler Hd.

In the case of duplex printing, the recording sheet S having passed through the decurler Hd is transported to the inversion path SH2 due to activation of the first gate GT1 and is switched back in the switchback path SH4 so as to be transported again to the registration roller Rr via the transport path SH, whereby printing is performed on the second face of the recording sheet S.

The recording sheet S to be output to the stacker tray TRh as an example of an output section is transported along the transport path SH so as to be output onto the stacker tray TRh. In this case, if the recording sheet S to be output to the stacker tray TRh is in an inverted state, the recording sheet S is temporarily transported to the inversion path SH2 from the transport path SH. After the trailing edge of the recording sheet S in the transport direction thereof passes through the second gate GT2, the second gate GT2 is switched and the switchback rollers Rb are rotated in the reverse direction so that the recording sheet S is transported along the connection path SH3 toward the stacker tray TRh.

When multiple recording sheets S are stacked on the stacker tray TRh, a stacker plate TRh1 automatically moves upward or downward in accordance with the number of stacked recording sheets S so that the uppermost sheet is disposed at a predetermined height.

Image Reading Device According to First Exemplary Embodiment

Figure 3A:
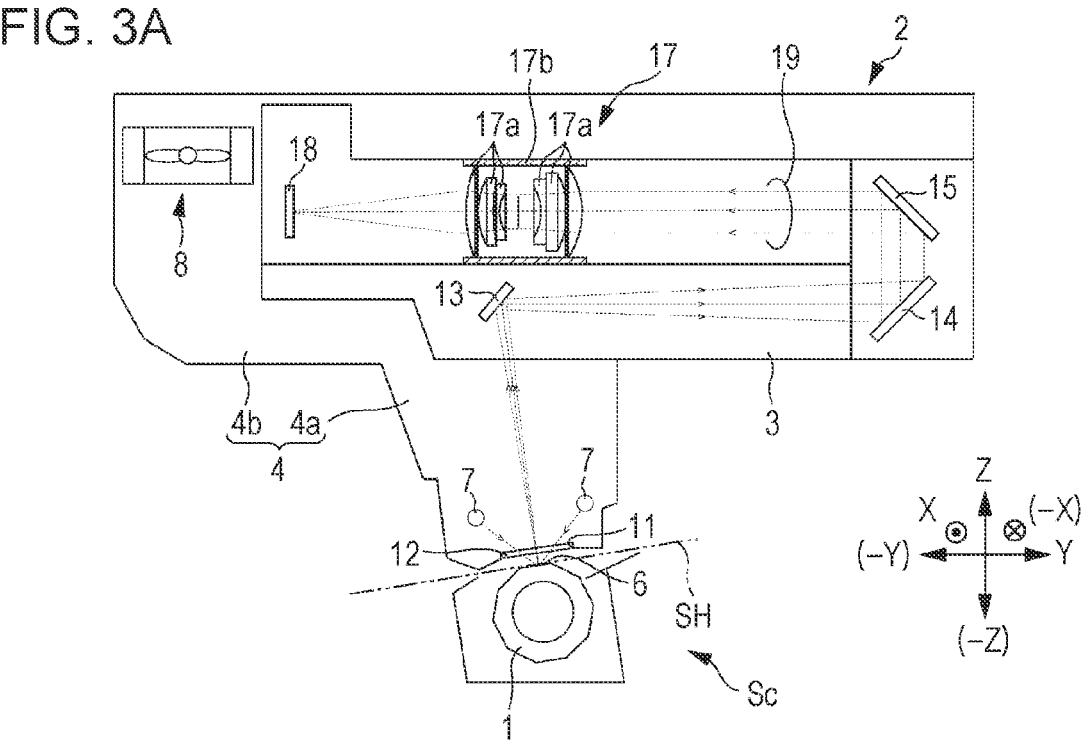
FIGS. 3A and 3B illustrate an image reading device according to the first exemplary embodiment, FIG. 3A being an enlarged view of a relevant part of the image reading device, FIG. 3B being an enlarged view of a relevant part of a read position.
Figure 3B:
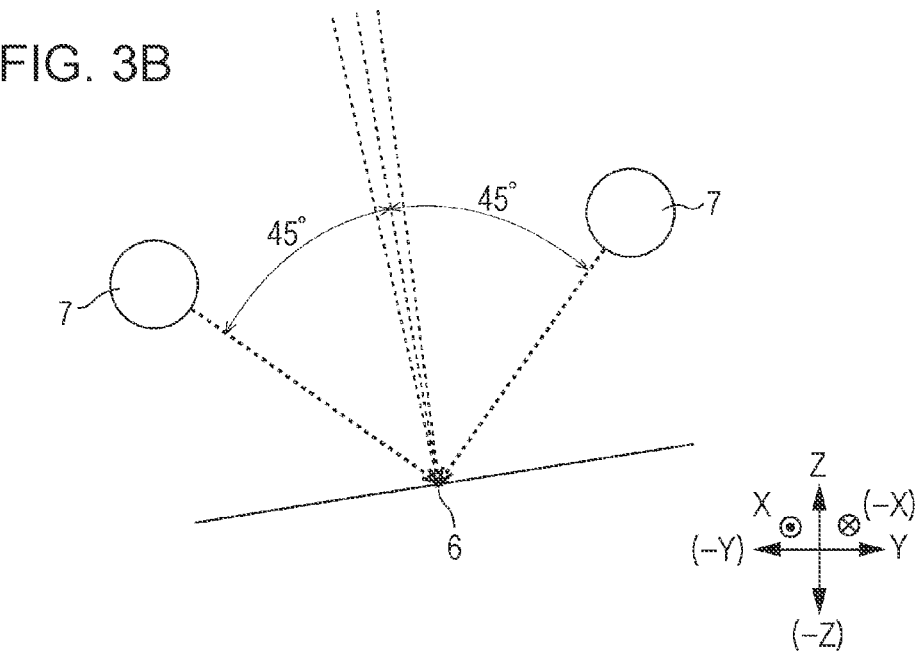

FIGS. 3A and 3B illustrate the image reading device according to the first exemplary embodiment. Specifically, FIG. 3A is an enlarged view of a relevant part of the image reading device, and FIG. 3B is an enlarged view of a relevant part of a read position.

Referring to FIGS. 3A and 3B, the image reading device Sc according to the first exemplary embodiment has a reference roller 1 as an example of a transport member that comes into contact with the lower surface of each recording sheet S transported along the transport path SH so as to transport the recording sheet S downstream. A body 2 of the image reading device Sc is disposed above the reference roller 1 with the transport path SH interposed therebetween. The body 2 includes a hollow-box-shaped optical-system accommodation section 3 located at an upper portion of the body 2 and extending in the transport direction and the widthwise direction of the recording sheet S, and a radiating-system accommodation section 4 disposed below and to the left of the optical-system accommodation section 3.

Lamps 7 as an example of light sources extending in the front-rear direction, which is the widthwise direction of the recording sheet S, are disposed in the radiating-system accommodation section 4. In the first exemplary embodiment, two lamps 7 are provided, each of which is disposed at a position that forms a 45° angle with the direction of the normal to the surface of the recording sheet S relative to a predetermined read position 6 on the transport path. The lamps 7 according to the first exemplary embodiment are formed of, but not limited to, white light emitting diodes (LEDs). Alternatively, light sources that output light having a continuous intensity in the wavelength band of visible light may be used. For example, tungsten lamps may be used.

Furthermore, a fan 8 as an example of a cooling member for cooling the lamps 7 is supported in the radiating-system accommodation section 4.

Figure 4A:
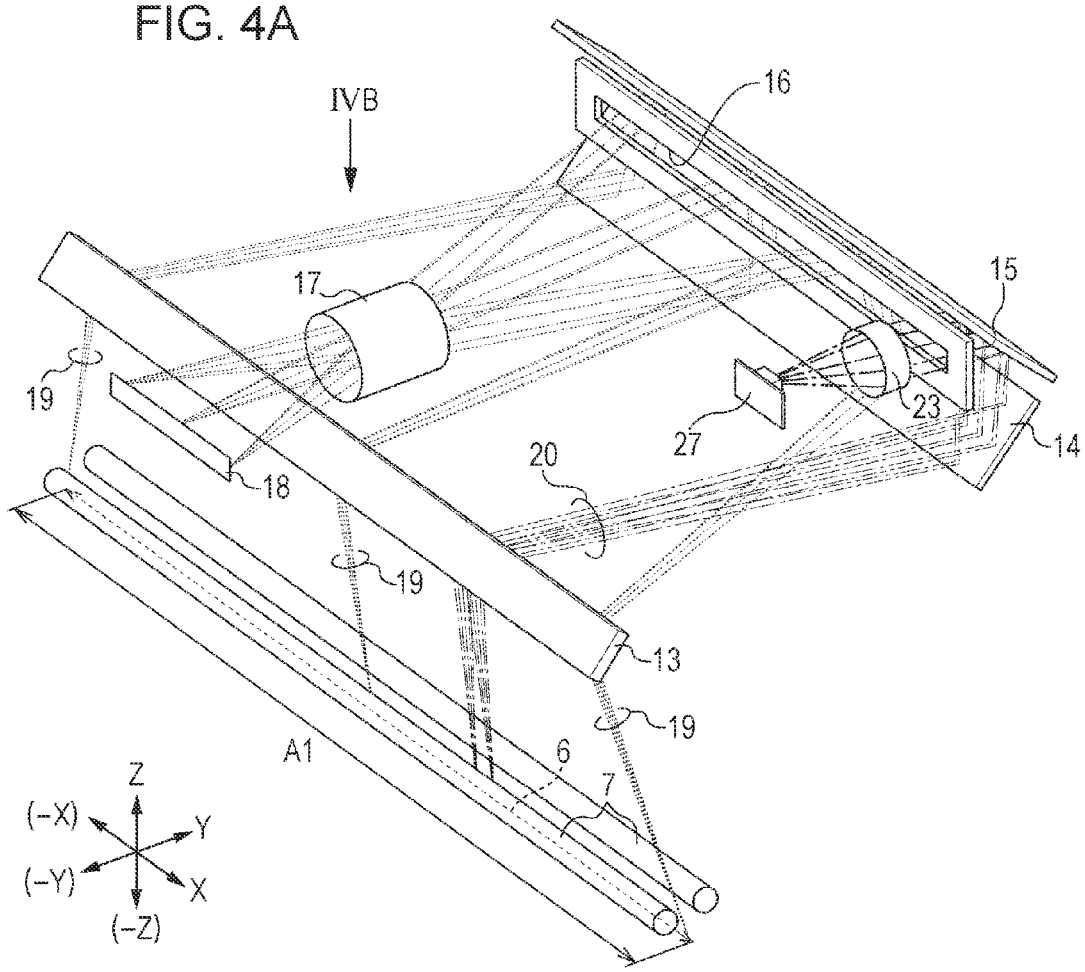
FIGS. 4A and 4B illustrate first and second reader systems in the image reading device according to the first exemplary embodiment, FIG. 4A illustrating a relevant part thereof, FIG. 4B being a diagram as viewed in a direction indicated by an arrow IVB in FIG. 4A.
Figure 4B:
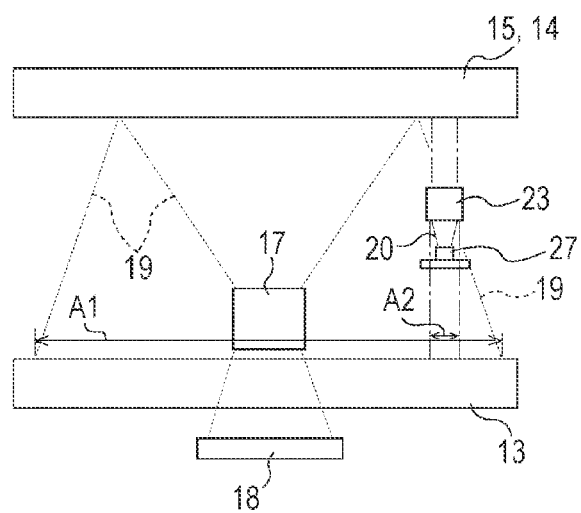

FIGS. 4A and 4B illustrate first and second reader systems in the image reading device according to the first exemplary embodiment. Specifically, FIG. 4A illustrates a relevant part of the systems, and FIG. 4B is a diagram as viewed in a direction indicated by an arrow IVB in FIG. 4A.

Figure 5:
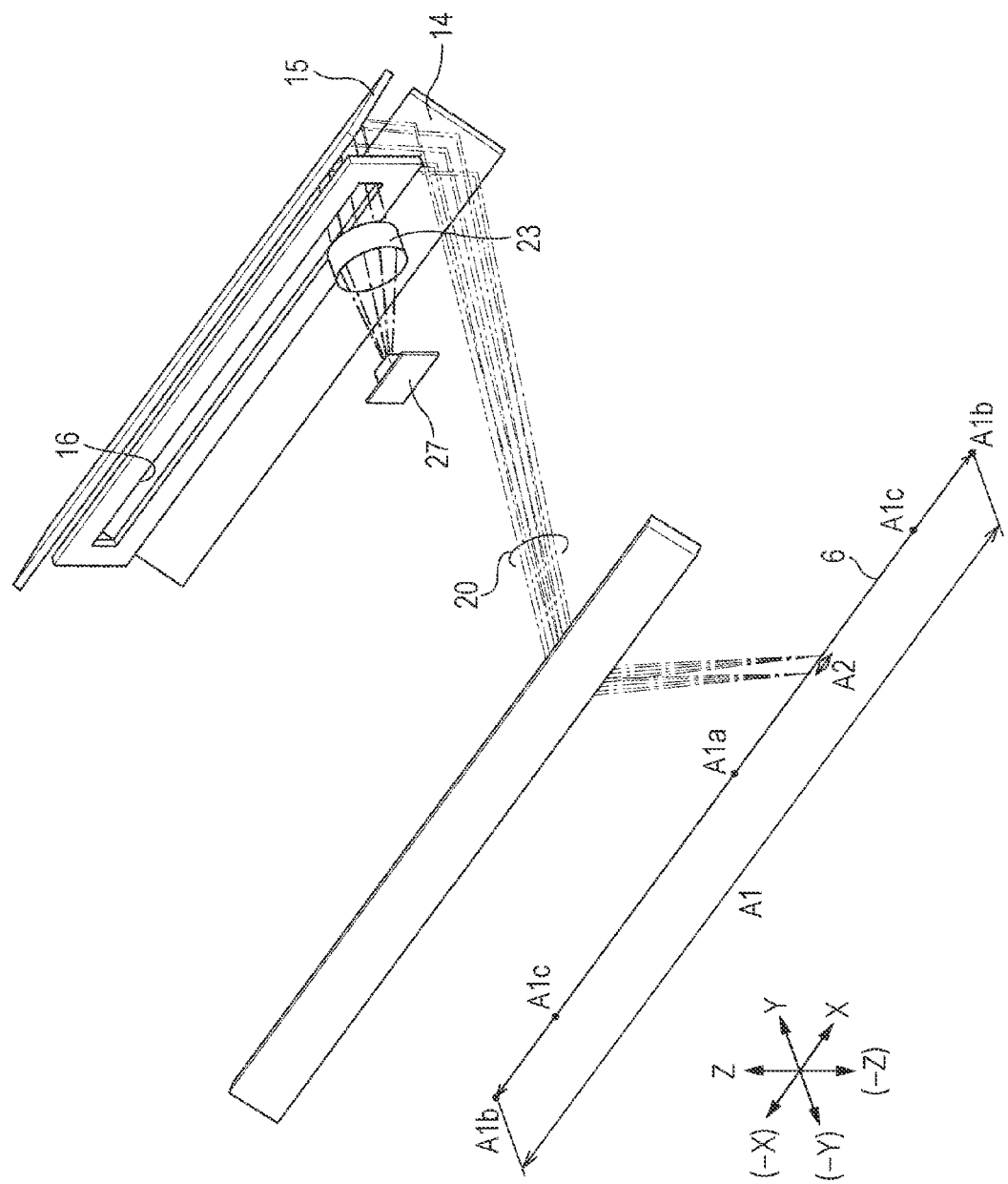
FIG. 5 illustrates the second reader system in the image reading device according to the first exemplary embodiment.

FIG. 5 illustrates the second reader system in the image reading device according to the first exemplary embodiment.

Referring to FIGS. 3A to 5, the radiating-system accommodation section 4 is provided with an aperture 11 located above the read position 6 and extending in the front-rear direction. The aperture 11 supports a transparent window member 12 that is capable of transmitting therethrough reflection light from the recording sheet S.

In the optical-system accommodation section 3, a first plane mirror 13 as an example of a first optical member that extends in the front-rear direction and reflects the light from the read position 6 rightward is supported above the window member 12. A second plane mirror 14 as an example of a second optical member that extends in the front-rear direction and reflects the light from the first mirror 13 upward is supported at the right side of the first mirror 13. A third plane mirror 15 as an example of a third optical member that extends in the front-rear direction and reflects the light from the second mirror 14 leftward is supported above the second mirror 14. The mirrors 13, 14, and 15 constitute an optical system 13+14+15 according to the first exemplary embodiment.

Referring to FIGS. 3A to 4B, a first imaging unit 17 as an example of a first imaging system that is disposed to the left of the third mirror 15 and that is located in a central area in the front-rear direction is supported via a window-like aperture 16 that blocks stray light, diffused reflection light, and the like. The first imaging unit 17 has a first imaging lens 17a as an example of a first imaging member that focuses the light from the third mirror 15 so as to form an image thereof. The first imaging lens 17a is accommodated inside a hood 17b as an example of a light blocking member that reduces the quantity of stray light entering the first imaging lens 17a.

An image capturing component 18 as an example of a first reader member that receives light so as to read an image of the read position 6 is disposed at the left side of the first imaging unit 17. Although a known charge-coupled device (CCD) image sensor having R, G, and B color filters is used as the image capturing component 18 in the first exemplary embodiment, a freely-chosen image capturing member that is capable of capturing an image used for detecting an image position, discoloration, an image defect, or the like may be used as an alternative.

At positions where the mirrors 13 to 15 according to the first exemplary embodiment are disposed, the light is not collimated. The first imaging lens 17a focuses light 19 that has reached the first imaging lens 17a from the third mirror 15 onto the image capturing component 18 so as to project an area A1 of the read position 6 onto the image capturing component 18. Accordingly, the image capturing component 18 according to the first exemplary embodiment is configured to read an image of a predetermined first read area A1 as an example of a read area, which is substantially the entire widthwise area of the recording sheet S passing through the read position 6.

Figure 6A:
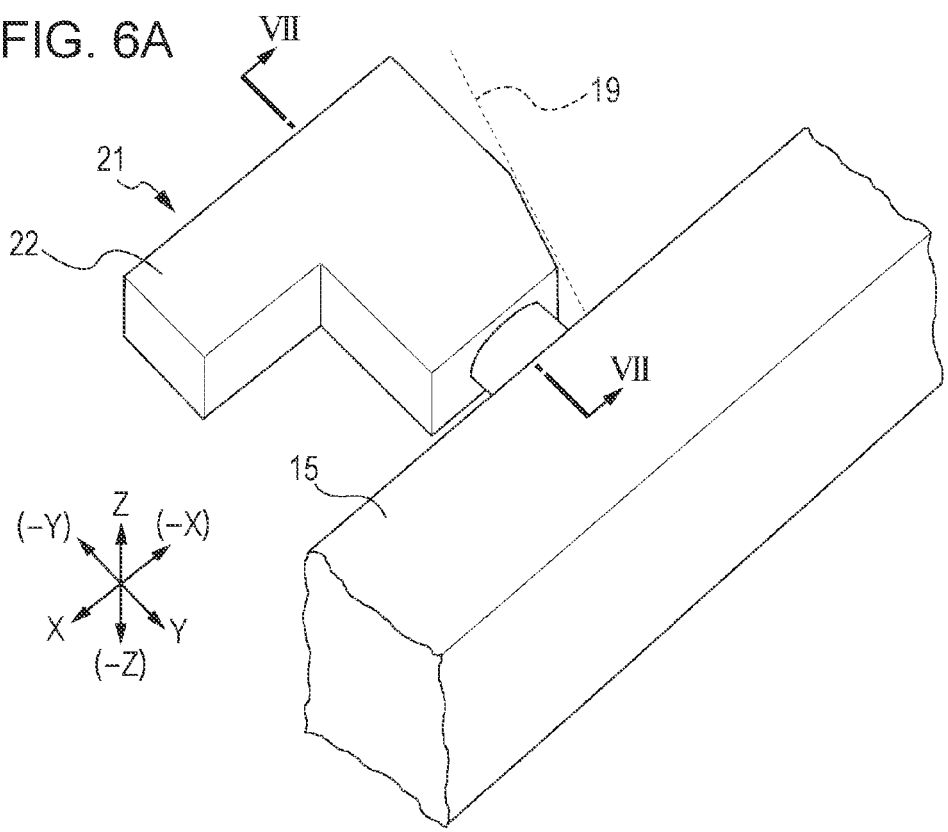
FIGS. 6A and 6B illustrate a relevant part of a second reader member according to the first exemplary embodiment, FIG. 6A being an external view thereof, FIG. 6B being a partial cross-sectional view thereof.
Figure 6B:
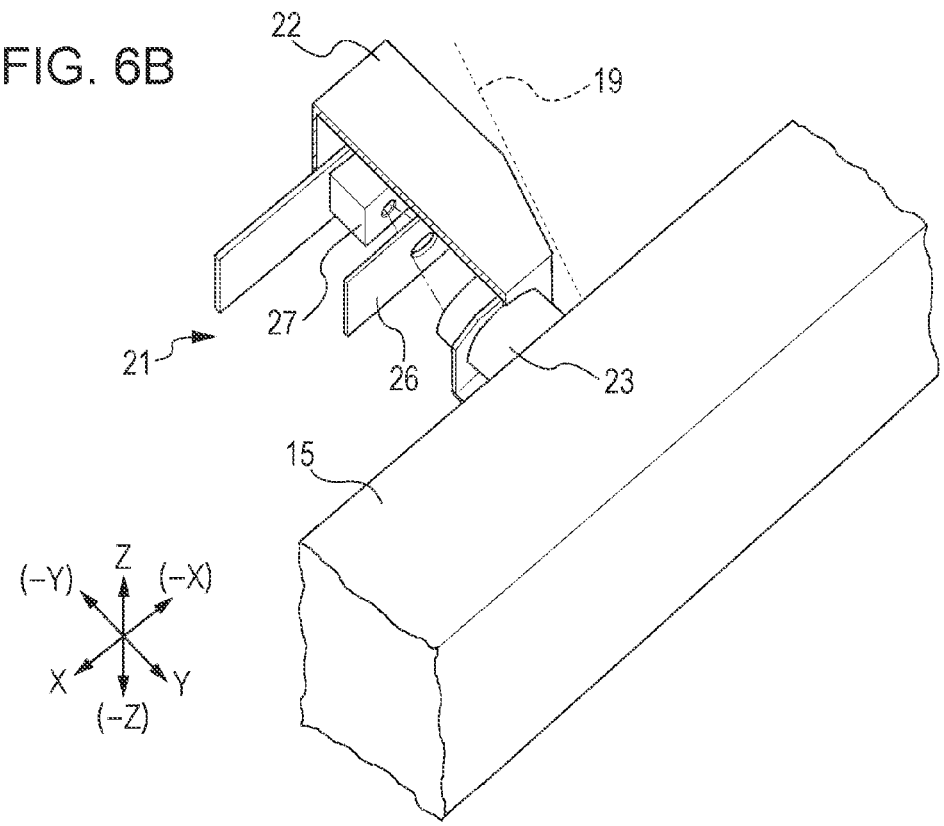

FIGS. 6A and 6B illustrate a relevant part of a second reader member according to the first exemplary embodiment. Specifically, FIG. 6A is an external view of the second reader member, and FIG. 6B is a partial cross-sectional view thereof.

Figure 7:
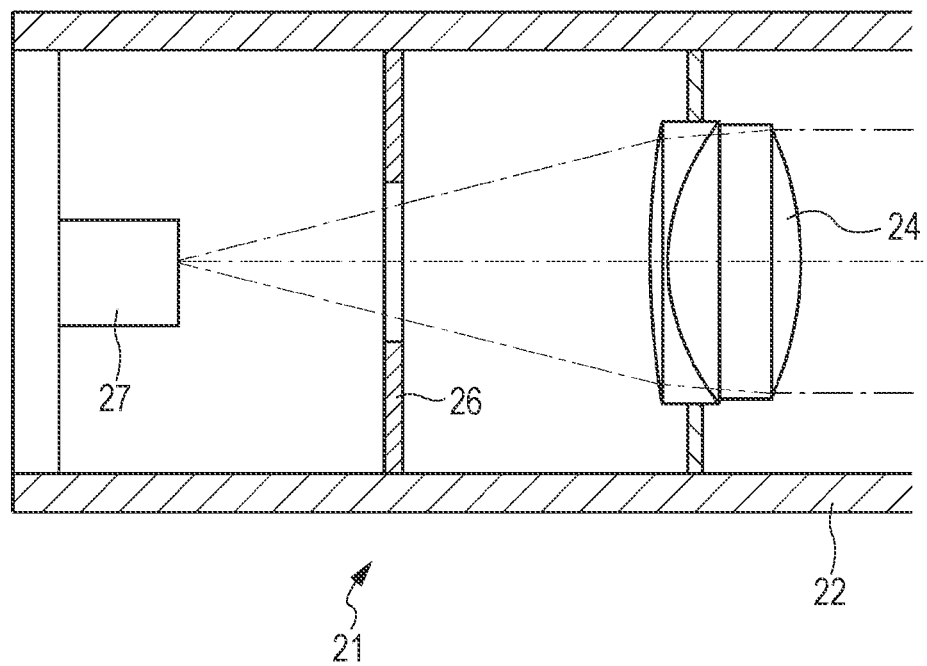
FIG. 7 is a cross-sectional view taken along line VII-VII in FIG. 6A.
Figure 7:
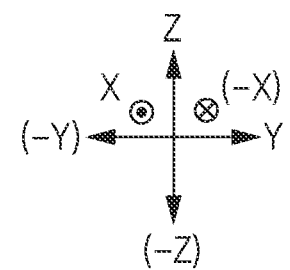

FIG. 7 is a cross-sectional view taken along line VII-VII in FIG. 6A.

Referring to FIGS. 3A and 3B and FIGS. 5 to 7, a color measurement unit 21 as an example of a second reader system is disposed to the left of the third mirror 15 as well as at the right and front sides of the first imaging lens 17a.

Referring to FIGS. 5 to 7, the color measurement unit 21 has a cover 22 as an example of a light blocking member. Referring to FIGS. 6A and 6B, the cover 22 is disposed at a position outside an optical path of the light 19 entering the first imaging lens 17a. Moreover, the cover 22 has a certain shape and is disposed at a certain position such that the cover 22 does not adversely affect the image captured by the image capturing component 18. Specifically, as shown in FIG. 4B, the color measurement unit 21 according to the first exemplary embodiment is disposed outside the optical path of the light 19 read by the image capturing component 18, and the length of an optical path of light 20 measured by the color measurement unit 21 is shorter than that of the light 19 read by the image capturing component 18. Furthermore, as shown in FIG. 4B, in the color measurement unit 21 according to the first exemplary embodiment, a color measurement sensor 27 is disposed inward of the first read area A1 and the third mirror 15 in the longitudinal direction thereof, that is, rearward of positions corresponding to front ends of the first read area A1 and the third mirror 15.

Referring to FIGS. 6A to 7, a hood 23 as an example of a light blocking member is supported within the cover 22, and a second imaging lens 24 as an example of a second imaging member that focuses the light from the third mirror 15 so as to form an image thereof is supported within the hood 23. An aperture 26 as an example of a light blocking member is supported at the left side of the second imaging lens 24, and the color measurement sensor 27 as an example of a second reader member is supported at the left side of the aperture 26. The color measurement sensor 27 according to the first exemplary embodiment includes therein a spectroscope (not shown) and a detector that detects spectral light, and reads the colors in the image of the read position 6. Various known types of color-measuring devices and colorimeters may be used as the color measurement sensor 27. Specifically, known color-measuring devices, such as a sensor that uses a spectro-component, such as a grating or a prism, to separate the light and measure the colors thereof, or a sensor that uses a bandpass filter to separate a visible wavelength band into about six to eight bands so as to measure the colors thereof, may be used. In other words, the color measurement sensor 27 according to the first exemplary embodiment may be a high-performance color-measuring device specialized for color measurement and having higher wavelength-resolution and color-separation capabilities and higher color measurement accuracy, as compared with a known CCD sensor having a color separation filter for three colors, i.e., RGB.

Referring to FIG. 5, assuming that the distance from a widthwise center A1a of the recording sheet S to an outer widthwise end A1b is defined as 100%, the color measurement sensor 27 according to the first exemplary embodiment reads an image of a predetermined second read area. A2 included in the first read area A1 and located inward of a position corresponding to 70% or smaller, that is, a 70%-position A1c. Therefore, in the first exemplary embodiment, the longitudinal direction of the first read area A1 to be read by the image capturing component 18 and the longitudinal direction of the second read area A2 are aligned with each other.

Referring to FIG. 3B, an optical axis of the color measurement sensor 27 according to the first exemplary embodiment is set within 10° relative to the normal to the measurement surface of the recording sheet S. Because an incident angle of light radiated onto the recording sheet S is substantially set to 45°, a regularly reflected component from the radiated light may be prevented from entering the color measurement sensor 27 by setting the tilt angle of the optical axis of the color measurement sensor 27 within 10°, thereby improving the color measurement accuracy.

Characteristics of Image Capturing Component and Color Measurement Sensor

Figure 8A:
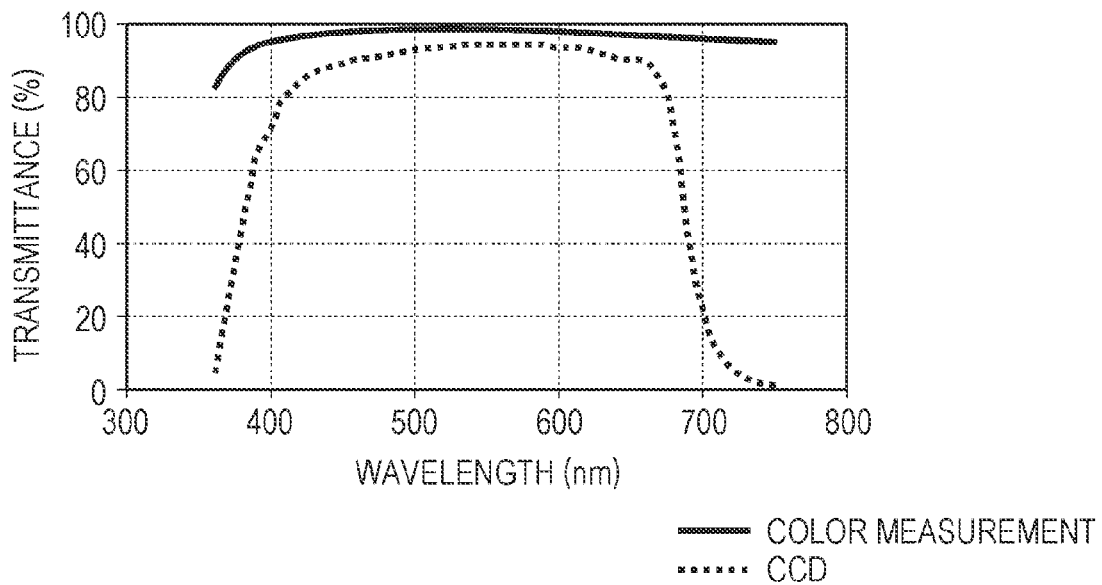
FIGS. 8A and 8B illustrate the characteristics of the two reader members used in the first exemplary embodiment, FIG. 8A being a spectral characteristic graph in which the horizontal axis denotes wavelength and the vertical axis denotes transmittance, FIG. 8B being an optical-system resolution graph in which the horizontal axis denotes spatial frequency and the vertical axis denotes modulation transfer function (MTF)
Figure 8B:
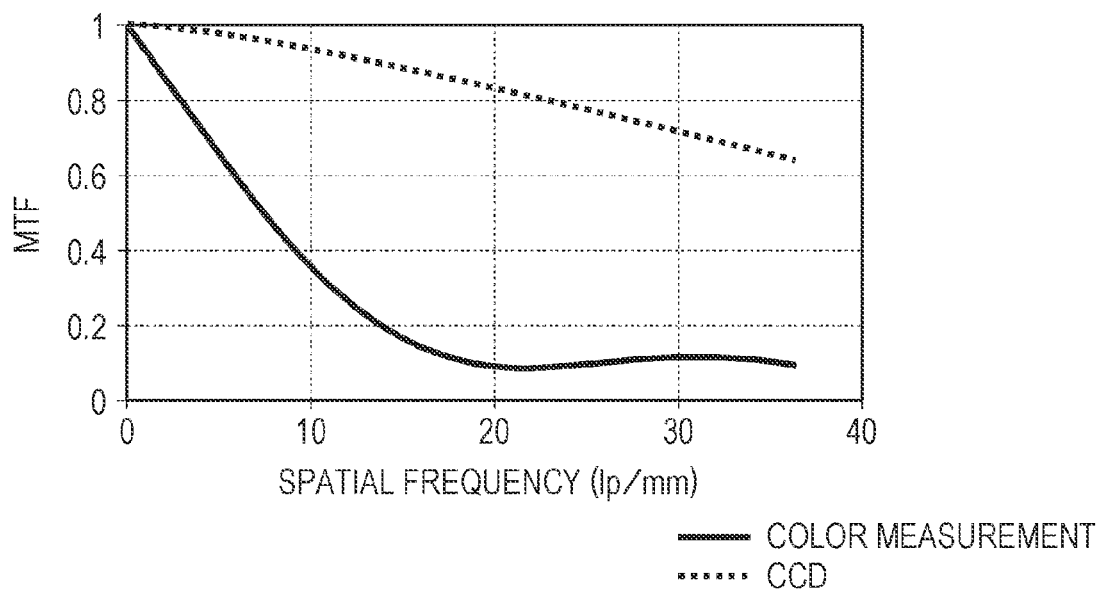

FIGS. 8A and 8B illustrate the characteristics of the two reader members used in the first exemplary embodiment. Specifically, FIG. 8A is a spectral characteristic graph in which the horizontal axis denotes wavelength and the vertical axis denotes transmittance, and FIG. 8B is an optical-system resolution graph in which the horizontal axis denotes spatial frequency and the vertical axis denotes modulation transfer function (MTF).

In FIGS. 8A and 8B, a dashed line denotes the characteristic of an image-capturing optical system 12+13+14+15+17+18, and a solid line denotes the characteristic of a color-measurement optical system 12+13+14+15+24+27. As shown in FIGS. 8A and 8B, the color-measurement optical system 12+13+14+15+24+27 has high transmittance over a wide wavelength band as compared with the image-capturing optical system 12+13+14+15+17+18, and tends to have a low demand with respect to MTF. In other words, the color-measurement optical system 12+13+14+15+24+27 has a high capability for color measurement, namely, for wavelength measurement of light, whereas the image-capturing optical system 12+13+14+15+17+18 has a low demand with respect to spectral transmittance but has high resolution so as to be capable of measuring an image position and the like with high accuracy.

Controller

Figure 9:
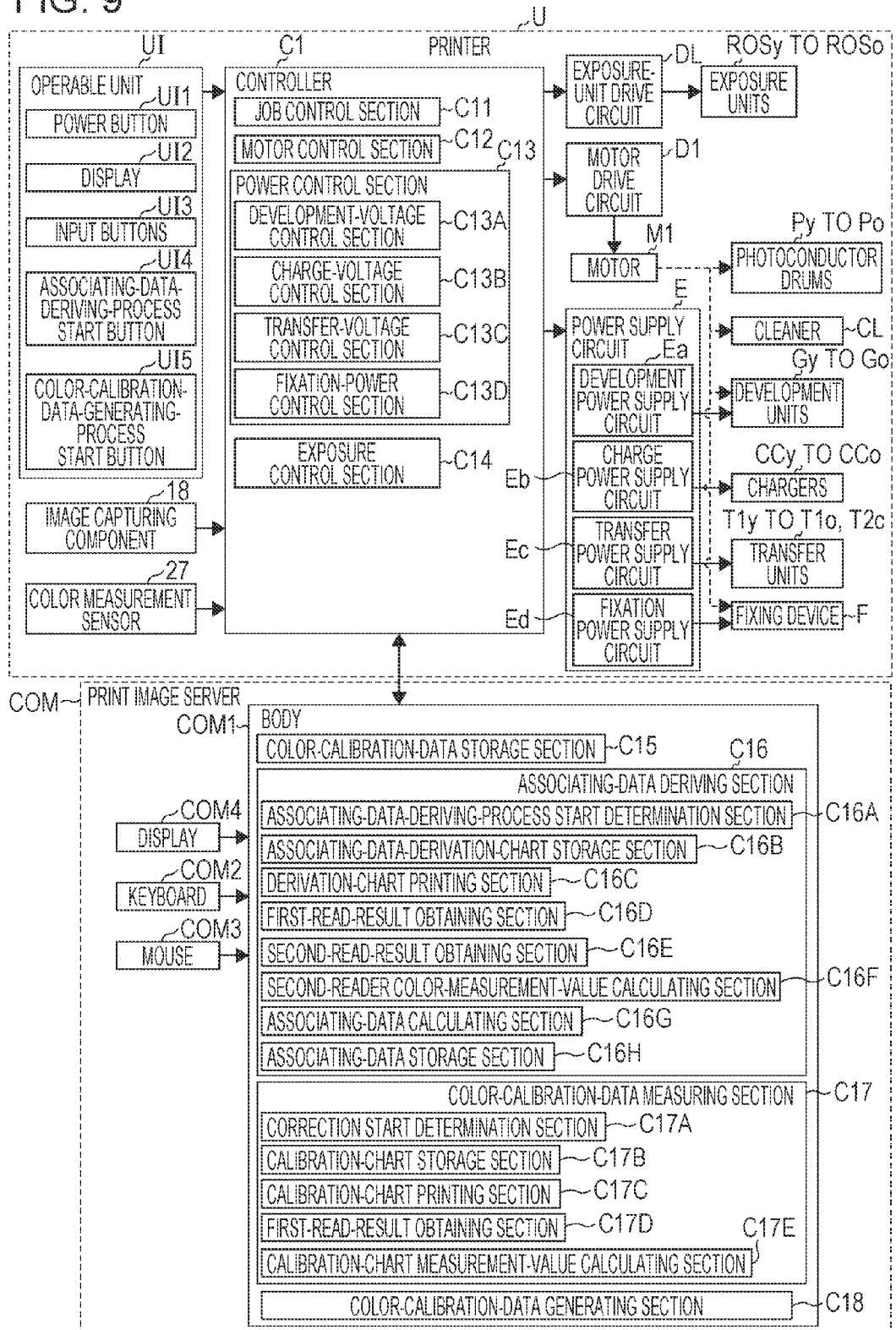
FIG. 9 is a functional block diagram illustrating functions included in a controller of the image reading device according to the first exemplary embodiment of the present invention.

FIG. 9 is a functional block diagram illustrating functions included in the controller for the print image server and the image reading device according to the first exemplary embodiment of the present invention.

Referring to FIG. 9, the controller C1 in the printer U according to the first exemplary embodiment is constituted of a small information processor, namely, a so-called microcomputer, and includes an input/output (I/O) unit that exchanges signals with the outside and that also adjusts input/output signal levels, a read-only memory (ROM) as an example of a storage medium that stores data as well as programs for executing processing, a random access memory (RAM) for temporarily storing data, a hard disk drive (HDD), a central processing unit (CPU) that performs processing in accordance with a program stored in the ROM or the HDD, and a clock generator. The controller C1 is capable of achieving various functions by executing the programs stored in the ROM.

Signal Input Components Connected to Controller

The controller C1 receives output signals from signal output components, such as the operable unit UI, the image capturing component 18, and the color measurement sensor 27.

The operable unit UI includes a power button UI1 as an example of a power switch for turning the printer U on and off, a display UI2, various input buttons UI3, such as arrow buttons, as an example of direction input buttons, an associating-data-deriving-process start button UI4 for starting an associating-information deriving process, and a color-calibration-data-generating-process start button UI5 for starting a process for generating and updating information for color calibration.

The image capturing component 18 reads an image of the first read area A1.

The color measurement sensor 27 reads an image of the second read area A2.

Controlled Components Connected to Controller C1

The controller C1 outputs control signals to the following controlled components DL, D1, and E.

An exposure-unit drive circuit DL controls the exposure units ROSy to ROSo so that latent images are formed on the surfaces of the photoconductor drums Py, Pm, PC, Pk, and Po.

A motor drive circuit D1 as an example of a drive-source drive circuit drives a motor M1 as an example of a drive source so that the photoconductor drums Py to Po are rotationally driven.

A power supply circuit E includes a development power supply circuit Ea, a charge power supply circuit Eb, a transfer power supply circuit Ec, and a fixation power supply circuit Ed.

The development power supply circuit Ea applies development voltage to developing rollers of the developing units Gy to Go.

The charge power supply circuit Eb applies charge voltage to the chargers CCy to CCo so as to charge the surfaces of the photoconductor drums Py to Po.

The transfer power supply circuit Ec applies first-transfer voltage to the first-transfer rollers T1y to T1o and also applies second-transfer voltage to the contact roller T2c of the second-transfer unit T2.

The fixation power supply circuit Ed supplies power for heating the heating roller Fh of the fixing device F.

Function of Controller C1 in Printer U

The controller C1 in the printer U has a function of executing processing according to input signals from the signal output components and outputting control signals to the controlled components. Specifically, the controller C1 has the following functions.

A job control section C11 as an example of an image-forming-operation control section controls the photoconductor drums Py to Po, the exposure units ROSy to ROSo, the chargers CCy to CCo, and the fixing device F in accordance with received image information so as to execute a job as an example of image forming operation.

A motor control section C12 as an example of a drive-source control section controls the driving of the motor M1 via the motor drive circuit D1 so as to control the driving of the photoconductor drums Py to Po, the development units Gy to Go, the heating roller Fh of the fixing device F, and an output roller Rh.

A power control section C13 includes a development-voltage control section C13A, a charge-voltage control section C13B, a transfer-voltage control section C13C, and a fixation-power control section C13D, and controls the operation of the power supply circuit E so as to control the voltages and the power supplied to the components.

The development-voltage control section C13A controls the development power supply circuit Ea so as to control the development voltage applied to the development units Gy to Go.

The charge-voltage control section C13B controls the charge power supply circuit Eb so as to control the charge voltage applied to the chargers CCy to CCo.

The transfer-voltage control section C13C controls the transfer power supply circuit Ec so as to control the transfer voltage applied to the first-transfer rollers T1y to T1o and the like.

The fixation-power control section C13D controls the fixation power supply circuit Ed so as to perform on/off control of the fixing device F, thereby controlling the fixation temperature.

An exposure control section C14 controls the exposure-unit drive circuit DL so as to drive the exposure units ROSy to ROSo, thereby forming latent images onto the surfaces of the photoconductor drums Py to Po.

Function of Print Image Server COM

Referring to FIG. 9, a body COM1 of the print image server COM according to the first exemplary embodiment is constituted of an information processor, namely, a so-called personal computer, and includes an input/output (I/O) unit that exchanges signals with the outside and that also adjusts input/output signal levels, a ROM as an example of a storage medium that stores data as well as programs for executing processing, a RAM for temporarily storing data, an HDD, a CPU that performs processing in accordance with a program stored in the ROM or the HDD, and a clock generator. The body COM1 is capable of achieving various functions by executing the programs stored in the ROM.

Signal Input Components Connected to Body COM1

The body COM1 of the print image server COM receives output signals from signal output components, such as a keyboard COM2 and a mouse COM3 as examples of input members. Furthermore, the body COM1 according to the first exemplary embodiment also receives an output signal from the printer U.

Controlled Components Connected to Body COM1

The body COM1 of the print image server COM outputs a control signal to a display COM4 as an example of a display serving as a controlled component. Furthermore, the body COM1 according to the first exemplary embodiment outputs a signal to the printer U electrically connected thereto via a line, such as a cable.

Function of Body COM1 of Print Image Server COM

A color-calibration-data storage section C15 as an example of a color-calibration-information storage section stores color-calibration data for calibrating the color reproducibility when received image information is to be printed onto a recording sheet S. The stored color-calibration data is for correcting color data in print image data input from the personal computer PC in accordance with the output characteristics of the printer U. In the first exemplary embodiment, coordinate values of an L*a*b* color system input from the personal computer PC are changed to coordinate values corrected in accordance with the output characteristics of the printer U.

Therefore, in the first exemplary embodiment, when print image data constituted of the L*a*b* color system is transmitted from the external personal computer PC and is received by the print image server COM, the color data in the print image is corrected in accordance with the color-calibration data. Then, the corrected print image data is color-converted from the L*a*b* color system to a YMCK system to be used in the printer U, and is transmitted to the printer U. Specifically, the input L*a*b*-color-system-based data (L*a*b*(in)) is corrected to L*a*b*-color-system-based data according to the color-calibration data (L*a*b*(in)→L*a*b*(out)), and the corrected L*a*b*-color-system-based data is converted to YMCK-system-based data (L*a*b*(out)→YMCK). Since various known types of configurations may be used as a color calibration unit in the print image server COM, a detailed description thereof will be omitted.

An associating-data deriving section C16 as an example of an associating-information deriving section includes an associating-data-deriving-process start determination section C16A, an associating-data-derivation-chart storage section C16B, a derivation-chart printing section C16C, a first-read-result obtaining section C16D, a second-read-result obtaining section C16E, a second-reader color-measurement-value calculating section C16F, an associating-data calculating section C16G, and an associating-data storage section C16H. Based on a first read result obtained by the image capturing component 18 reading a recording sheet S having printed thereon an associating-data derivation chart as an example of an image with predetermined colors and a second read result obtained by the color measurement sensor 27 reading the recording sheet S, the associating-data deriving section C16 according to the first exemplary embodiment derives associating data as an example of associating information that associates the first read result with the second read result.

The associating-data-deriving-process start determination section C16A as an example of an associating-information-deriving-process start determination section determines whether or not it is time to start an associating-data deriving process. The associating-data-deriving-process start determination section C16A according to the first exemplary embodiment determines that it is time to start the associating-data deriving process if a signal indicating that the associating-data-deriving-process start button UI4 is operated is input to the print image server COM from the printer U.

Figure 10A:
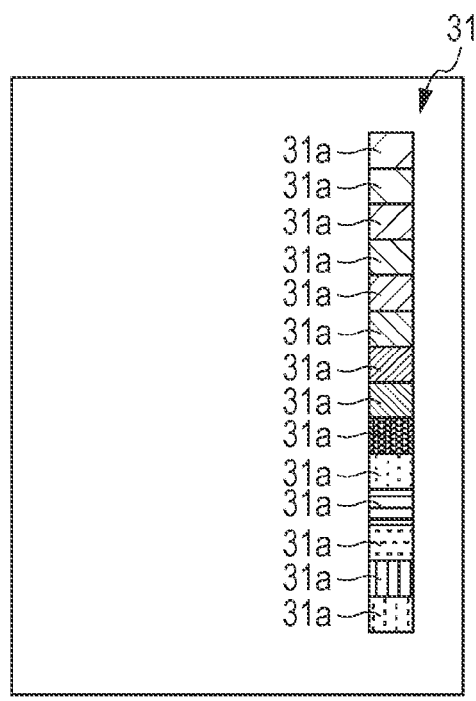
FIGS. 10A and 10B illustrate images read in the first exemplary embodiment, FIG. 10A illustrating an associating-data derivation chart, FIG. 10B illustrating a color-calibration chart.
Figure 10B:
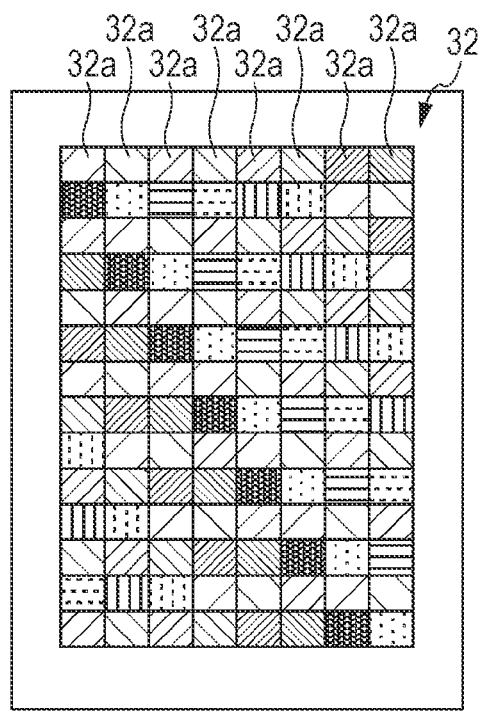

FIGS. 10A and 10B illustrate images read in the first exemplary embodiment. Specifically, FIG. 10A illustrates an associating-data derivation chart, and FIG. 10B illustrates a color-calibration chart.

The associating-data-derivation-chart storage section C16B as an example of an associating-information-derivation-chart storage section stores a derivation chart 31 as an example of an image for deriving associating data that associates the read result of the image capturing component 18 with the read result of the color measurement sensor 27. Referring to FIG. 10A, in the derivation chart 31 according to the first exemplary embodiment, patches 31a as an example of images having predetermined colors are disposed at positions corresponding to the second read area A2 of the color measurement sensor 27, and are arranged one-dimensionally in the transport direction of the recording sheet S. The patches 31a include predetermined images of 1,188 colors for calibration, which are arranged in the transport direction of the recording sheet S. The number of colors of the calibration patches 31a is not limited to the number described in the first exemplary embodiment, but may be increased or decreased in accordance with the design, specifications, demanded accuracy, and the like.

When the associating-data deriving process commences, the derivation-chart printing section C16C reads data of the derivation chart 31 stored in the associating-data-derivation-chart storage section C16B, transmits the data to the printer U, and prints the derivation chart 31 onto the recording sheet S via the job control section C11.

When the recording sheet S having the derivation chart 31 printed thereon passes through the read area A1, the first-read-result obtaining section C16D obtains a first read result output from the image capturing component 18. Specifically, the first-read-result obtaining section C16D according to the first exemplary embodiment obtains R, G, and B values of light passing through respective filters.

When the recording sheet S having the derivation chart 31 printed thereon passes through the second read area A2, the second-read-result obtaining section C16E obtains a second read result output from the color measurement sensor 27. Specifically, the second-read-result obtaining section C16E according to the first exemplary embodiment obtains spectrum values measured by the color measurement sensor 27.

Based on the spectrum values obtained by the second-read-result obtaining section C16E, the second-reader color-measurement-value calculating section C16F calculates L*a*b* values, that is, color measurement values in the L*a*b* color system as an example of a color space. Specifically, the second-reader color-measurement-value calculating section C16F according to the first exemplary embodiment calculates stimulus values (XYZ) from the measured spectrum by integrating the intensities at respective wavelengths, and calculates L*a*b* values from the stimulus values (XYZ).

Based on the first read result and the second read result, the associating-data calculating section C16G calculates associating data that associates the first read result with the second read result. Specifically, the associating-data calculating section C16G according to the first exemplary embodiment calculates a transform function between the R, G, and B values obtained by the first-read-result obtaining section C16D and the L*a*b* values derived from the second read result by the second-reader color-measurement-value calculating section C16F as the associating data for each of the 1,188 colors.

The associating-data storage section C16H as an example of an associating-information storage section stores the associating data calculated by the associating-data calculating section C16G.

A color-calibration-data measuring section C17 as an example of a color measuring section includes a correcting-process start determination section C17A, a calibration-chart storage section C17B, a calibration-chart printing section C17C, a first-read-result obtaining section C17D, and a calibration-chart measurement-value calculating section C17E. When measuring the colors of the image on the recording sheet S so as to perform color calibration in the printer U, the color-calibration-data measuring section C17 according to the first exemplary embodiment reads the recording sheet S by using the image capturing component 18 and determines the L*a*b* values, which indicate the colors corresponding to the second read result, on the basis of the first read result and the associating data, thereby measuring the colors in the calibration chart.

The correcting-process start determination section C17A determines whether or not it is time to start a color-calibration-data correcting process. The correcting-process start determination section C17A according to the first exemplary embodiment determines that it is time to start the color-calibration-data correcting process, that is, a process for generating and updating the latest color-calibration data, if a signal indicating that the color-calibration-data-generating-process start button UI5 is operated is input to the print image server COM from the printer U. Furthermore, the correcting-process start determination section C17A according to the first exemplary embodiment also determines that it is time to start the color-calibration-data correcting process when the associating data is derived, and starts the color-calibration-data correcting process on the basis of the L*a*b* values calculated by the associating-data calculating section C16G. The timing for starting the color-calibration-data correcting process is not limited to when the color-calibration-data-generating-process start button UI5 is operated. Alternatively, the color-calibration-data correcting process may be started at a predetermined timing. For example, the color-calibration-data correcting process may be started every time 1,000 sheets have been printed, or at a predetermined time point or a specific day of the week on the basis of a built-in clock.

The calibration-chart storage section C17B as an example of a calibration-image storage section stores a color-calibration chart 32 as an example of an image for correcting the color-calibration data. Referring to FIG. 10B, the color-calibration chart 32 according to the first exemplary embodiment has patches 32a similar to the patches 31a in the derivation chart 31. The patches 32a are arranged two-dimensionally in the transport direction and the widthwise direction of the recording sheet S in correspondence with corresponding positions within the first read area A1 readable by the image capturing component 18. Like the derivation chart 31, the color-calibration chart 32 has patches 32a for 1,188 colors.

When the color-calibration-data correcting process commences, the calibration-chart printing section C17C as an example of a calibration-image printing section reads data of the color-calibration chart 32 stored in the calibration-chart storage section C17B, transmits the data to the printer U, and prints the color-calibration chart 32 onto the recording sheet S via the job control section C11.

Similar to the first-read-result obtaining section C16D, when the recording sheet S having the color-calibration chart 32 printed thereon passes through the first read area A1, the first-read-result obtaining section C17D obtains a first read result output from the image capturing component 18. Specifically, like the first-read-result obtaining section C16D, the first-read-result obtaining section C17D according to the first exemplary embodiment obtains R, G, and B values of light passing through the respective filters.

The calibration-chart measurement-value calculating section C17E as an example of a calibration-image color-measurement-value calculating section calculates L*a*b* values, which are colors corresponding to the second read result, on the basis of the first read result of the image capturing component 18 obtained by the first-read-result obtaining section C17D and the associating data. The calibration-chart measurement-value calculating section C17E according to the first exemplary embodiment calculates the L*a*b* values for each color of the patches 32a. If the associating data has no values corresponding to the RGB values of the first read result, the calibration-chart measurement-value calculating section C17E according to the first exemplary embodiment calculates the L*a*b* values by interpolating values for the associating data from a surrounding area of the RGB space thereof.

A color-calibration-data generating section C18 as an example of a color-calibration-information generating section generates and updates the color-calibration data stored in the color-calibration-data storage section C15 on the basis of the L*a*b* values calculated by the calibration-chart measurement-value calculating section C17E. Specifically, the color-calibration-data generating section C18 according to the first exemplary embodiment generates and updates the color-calibration data in accordance with a difference between the L*a*b* values of predetermined colors of the patches 32a and the L*a*b* values actually measured by using the image capturing component 18. The color-calibration-data generating and updating process is the same as a calibration process generally performed in the image forming apparatus and is widely known. Therefore, a detailed description thereof will be omitted.

Flow of Process in First Exemplary Embodiment

Next, the process performed in the printer U according to the first exemplary embodiment will be described with reference to a flowchart.

Flowchart of Color-Calibration-Data Generating Process

Figure 11:
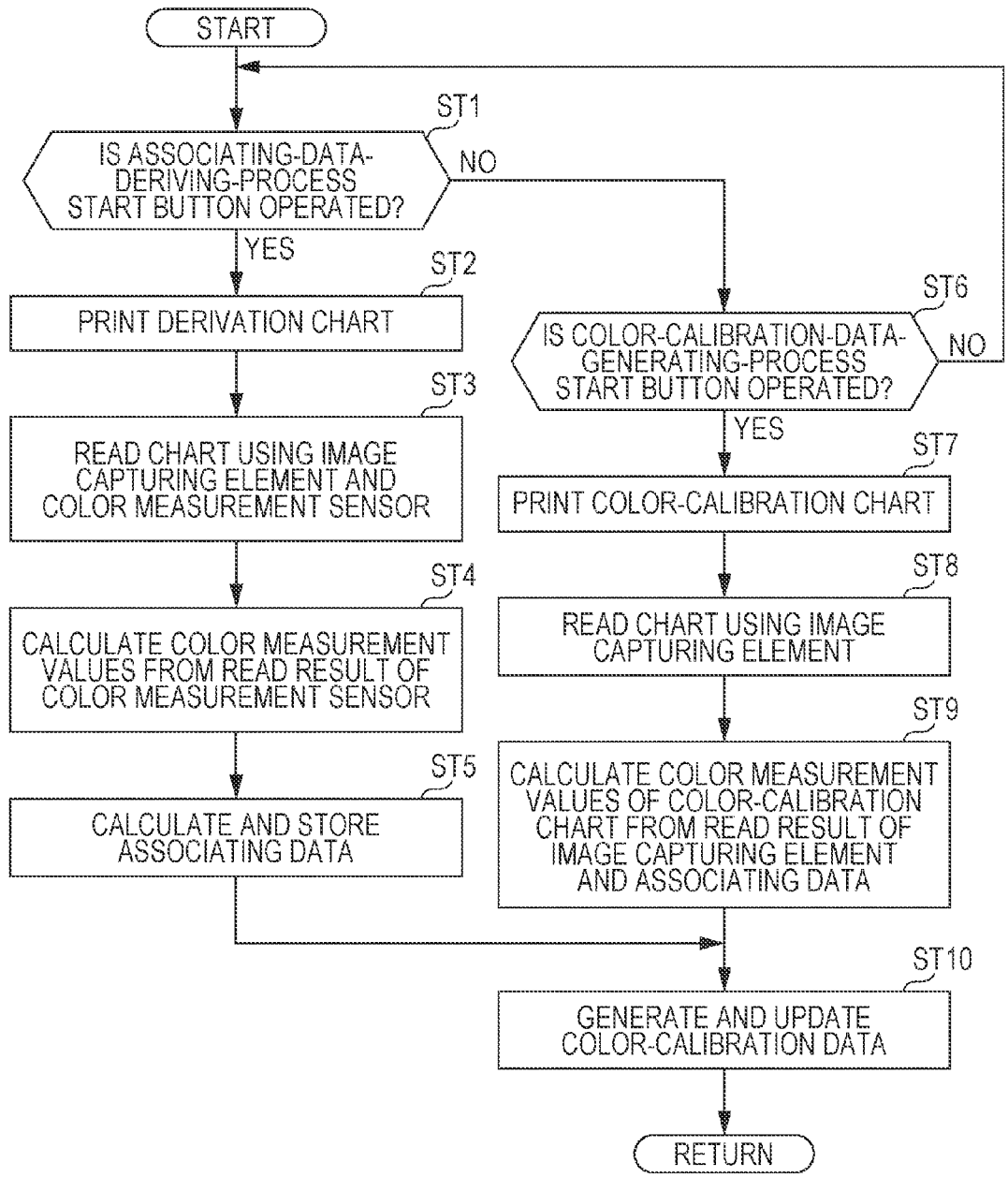
FIG. 11 is a flowchart of a process for generating associating data and color-calibration data in the first exemplary embodiment.

FIG. 11 is a flowchart of a process for generating associating data and color-calibration data in the first exemplary embodiment.

The steps (ST) in the flowchart in FIG. 11 are performed in accordance with a program stored in the hard disk drive or the like of the controller C1 in the printer U. These steps are executed based on parallel-processing in which the steps are performed in parallel with other various processes in the printer U.

The flowchart shown in FIG. 11 commences when the power of the printer U is turned on.

In step ST1 in FIG. 11, it is determined whether or not the associating-data-deriving-process start button UI4 is operated. If yes (Y), the process proceeds to step ST2. If no (N), the process proceeds to step ST6.

In step ST2, the derivation chart 31 is printed, and the process proceeds to step ST3.

In step ST3, the derivation chart 31 is read by the image capturing component 18 and the color measurement sensor 27. The process then proceeds to step ST4.

In step ST4, L*a*b* values, which are color measurement values of an associating-data chart, are calculated from the read result of the color measurement sensor 27. The process then proceeds to step ST5.

In step ST5, associating data that associates R, G, and B values of the image capturing component 18 with the L*a*b* values of the color measurement sensor 27 is calculated, and the calculated associating data is stored. The process then proceeds to step ST10.

In step ST6, it is determined whether or not the color-calibration-data-generating-process start button UI5 is operated. If yes (Y), the process proceeds to step ST7. If no (N), the process returns to step ST1.

In step ST7, the color-calibration chart 32 is printed, and the process proceeds to step ST8.

In step ST8, the color-calibration chart 32 is read by the image capturing component 18. The process then proceeds to step ST9.

In step ST9, L*a*b* values, which are color measurement values of the calibration chart, are calculated from the read result of the image capturing component 18 and the associating data. The process then proceeds to step ST10.

In step ST10, color-calibration data is generated and updated on the basis of the calculated L*a*b* values and set values of the patches 32a. The process then returns to step ST1.

Operation of Image Reading Device According to First Exemplary Embodiment

In the image reading device Sc according to the first exemplary embodiment having the above-described configuration, when the associating-data deriving process commences, the marking unit U1a generates the derivation chart 31. After the derivation chart 31 is transferred and fixed onto the recording sheet S, the recording sheet S undergoes a cooling process. Subsequently, the recording sheet S passes through the read position 6. When passing through the read position 6, light radiated from the lamps 7 is reflected at the derivation chart 31 and is measured by the image capturing component 18 and the color measurement sensor 27 via the optical system 13+14+15.

RGB values are measured by the image capturing component 18, and L*a*b* values are calculated from measurement values of the color measurement sensor 27, so that associating data between the RGB values and the L*a*b* values is calculated. Therefore, associating data between the RGB values and the L*a*b* values of the color measurement sensor 27 is generated for each individual unit of the printer U in correspondence with individual differences among the lamps 7, the optical system 13+14+15, and the image capturing component 18.

In the printer U according to the first exemplary embodiment, when the associating data is generated, color-calibration data corresponding to a difference between the colors of a printed image and the measured colors is also generated based on the measurement result of the color measurement sensor 27. Then, in a subsequent printing operation and onward, the controller C1 adjusts color information L*a*b* of image data output to the printer U based on the color-calibration data so as to perform color calibration.

In the printer U according to the first exemplary embodiment, when the color-calibration-data generating process commences, the color-calibration chart 32 is printed and is measured by the image capturing component 18, and the L*a*b* values are calculated on the basis of the associating data, so that the color-calibration data is updated.

Therefore, when the associating data is generated, the color-calibration data may be updated or corrected on the basis of the read result of the image capturing component 18, which is capable of performing reading at higher speed than the color measurement sensor 27, without having to separate the light. Thus, the overall speed for updating the color-calibration data is increased. In this case, in the first exemplary embodiment, calculation is performed based on the read result of the image capturing component 18 by using the associating data. By using the associating data, a degree of accuracy equivalent to the measurement accuracy of the color measurement sensor 27 may be ensured. Therefore, the color-calibration data may be corrected with high accuracy, as compared with a case where color calibration is performed by using the image capturing component 18 alone, which has a lower color measurement capability than the color measurement sensor 27, without using the color measurement sensor 27 or the associating data. Consequently, in the printer U according to the first exemplary embodiment, the color-calibration data may be generated and updated at high speed with high accuracy.

Specifically, as shown in FIG. 10B, in the first exemplary embodiment, the color-calibration chart 32 to be read by the image capturing component 18 includes the patches 32a that are two-dimensionally arranged in the transport direction and the widthwise direction of the recording sheet S. If the color measurement sensor 27 is used, the readable area thereof is narrow, like the second read area A2, and the time that it takes to read all of the patches 31a increases with increasing number of patches 31a to be read. In particular, in order to read the patches 31a automatically and continuously, the patches 31a are read while being transported in a one-dimensional arrangement, as in the derivation chart 31.

In contrast, in the first exemplary embodiment, the patches 32a are two-dimensionally arranged, and the first read area A1 that is longer than the second read area A2 in the widthwise direction is read by the image capturing component 18 at once, whereby the reading process and the color-calibration-data updating process may be performed at higher speed, as compared with the case where the one-dimensionally arranged patches 31a are read. Furthermore, with the two-dimensional arrangement, the number of patches 32a arranged on a single recording sheet S may be increased, as compared with the one-dimensional arrangement, thereby allowing for a reduced number of recording sheets S.

Furthermore, when generating the associating data in the first exemplary embodiment, the lamps 7 serving as light sources and the optical system 13+14+15 are shared, and the same patches 31a are simultaneously read by the image capturing component 18 and the color measurement sensor 27. If the reading processes are performed individually by using an L*a*b*-system-based densitometer and an RGB-system-based color scanner, different light sources and different optical systems are used. In this case, the illumination conditions, the temperature, stray light, vibration of the optical system, a cavity effect, and the like may differ between the measurement processes, which is a problem in that this difference may be included in the two read results as an error. Moreover, when using a printed chart, the colors of the toners or inks may sometimes change or deteriorate over time. If there is a so-called time lag until the reading process, an error may occur in the read result. In contrast, in the first exemplary embodiment, the shared lamps 7 and the shared optical system 13+14+15 are used, and the patches 31a are simultaneously read, thereby reducing an error and improving the color-calibration accuracy. In the printer U according to the first exemplary embodiment in which the lamps 7 and the like are shared, size reduction and reduced power consumption may be achieved, as compared with a case where the color calibration is performed by using separately-provided lamps 7 and the like.

Furthermore, in the first exemplary embodiment, the charts 31 and 32 are printed and read, so that the costs for generating and managing the charts may be reduced, as compared with a case where dedicated charts having patches or colors printed thereon are prepared in advance.

Furthermore, when the lamps 7 and the optical system 13+14+15 are replaced due to failure or due to degradation over time, associating data can be derived. In this case, associating data corresponding to the replaced lamps 7 and the like may be generated, and the color-calibration data may also be updated. Therefore, associating data and color-calibration data are automatically generated and updated in accordance with every condition of the printer U, thereby allowing for printing of an image with high color reproducibility.

Furthermore, in the printer U according to the first exemplary embodiment, when the buttons UI4 and UI5 are operated, the charts 31 and 32 are printed and read while being transported, so that the associating data and the color-calibration data are automatically generated. Thus, the associating data and the color-calibration data may be readily generated, as compared with a case where a measurement process using a densitometer is manually performed.

Furthermore, in the first exemplary embodiment, since the first area A1 to be measured by the image capturing component 18 and the second area A2 to be measured by the color measurement sensor 27 share the same longitudinal direction, the read area of the recording sheet S in the moving direction thereof may be reduced, as compared with a case where the two areas have different longitudinal directions. Accordingly, the lamps 7 and the mirrors 13 to 15 may be reduced in size, thereby achieving size reduction of the image reading device Sc. Moreover, at the outer longitudinal edges of the printer U, the image forming capability generally tends to become unstable as compared with the central area thereof, possibly resulting in reduced accuracy of the image characteristics to be measured. In contrast, in the first exemplary embodiment, the second read area A2 is disposed inward of the 70%-position in the X-axis direction of the recording sheet S, so that the color measurement accuracy may be improved, as compared with a case where the second read area A2 is disposed toward an outer edge.

Furthermore, in the first exemplary embodiment, the color measurement sensor 27 is disposed within the width of the first read area A1 in the longitudinal direction, as shown in FIG. 4B. Therefore, as viewed in the longitudinal direction, the color measurement sensor 27 is disposed in an area that is not used for reading by the image capturing component 18, that is, an area where the third mirror 15 is disposed but acting as a dead space. Consequently, in the image reading device Sc according to the first exemplary embodiment, the dead space is efficiently utilized, thereby reducing the space in the longitudinal direction, as compared with a case where the image capturing component 18 and the color measurement sensor 27 are separately disposed. Thus, in the longitudinal direction, at least a portion of the color measurement sensor 27 may be disposed at a position inward of the first read area A1, that is, a position that overlaps the third mirror 15. As in the first exemplary embodiment, the entire color measurement sensor 27 may be disposed inward of the first read area A1.

Furthermore, in the first exemplary embodiment, the second imaging lens 24 of the color measurement sensor 27 is provided separately from the first imaging lens 17a used by the image capturing component 18, so that the color measurement sensor 27 and the image capturing component 18 may be positionally displaced relative to each other. Consequently, the degree of freedom in terms of design is improved.

In particular, the color measurement sensor 27 is disposed closer toward the third mirror 15 relative to the image capturing component 18, and has a short optical path for the light 20. In general, if a certain light quantity is to be ensured as the optical path increases in length, a lens with a large aperture is used, possibly resulting in an increase in size of the second imaging lens 24. In contrast, in the first exemplary embodiment, the optical path of the light 20 entering the color measurement sensor 27 is short so that an increase in size of the second imaging lens 24 may be suppressed, thereby achieving size reduction and cost reduction.

Furthermore, in the first exemplary embodiment, the tilt angle of the second imaging lens 24 relative to the normal to the surface of the recording sheet S is set within 10° so that regularly reflected light from the lamps 7 may be prevented from entering the second imaging lens 24, thereby allowing for highly accurate color measurement.

Furthermore, in the first exemplary embodiment, the charts 31 and 32 printed on the recording sheet S by the marking unit U1a is read by the image capturing component 18 and the color measurement sensor 27. Specifically, unlike a case where the colors, discoloration, and the like are determined by capturing visible images developed on the surfaces of the photoconductor drums Py to Po or visible images transferred onto the surface of the intermediate transfer belt B, images printed on the recording sheet S that are to be actually viewed by the user are read in the first exemplary embodiment. Therefore, the measurement process is performed on the basis of images that are closer to reality, as compared with the case where the images on the surfaces of the photoconductor drums Py to Po and the like are read, thereby reducing a difference between the calibration result and the printed result.

Furthermore, in the first exemplary embodiment, the light blocking members 17b, 22, 23, and 26 are disposed such that an adverse effect of stray light on the imaging lens 17a and 24 may be reduced. In particular, the color measurement sensor 27 is surrounded by the hood 23 so that a reduction in the color measurement accuracy may be suppressed.

Modifications

Although the exemplary embodiment of the present invention has been described in detail above, the present invention is not to be limited to the above exemplary embodiment and permits various modifications within the technical scope of the invention defined in the claims. Modifications H01 to H016 will be described below.

In a first modification H01, the image forming apparatus according to the above exemplary embodiment is not limited to the printer U, but may be, for example, a copier, a facsimile device, or a multifunction apparatus having multiple or all functions of such devices.

In the above exemplary embodiment, the printer U is configured to use developers of five colors. Alternatively, in a second modification H02, the above exemplary embodiment may be applied to, for example, a monochrome image forming apparatus or a multicolor image forming apparatus that uses four colors or fewer, or six colors or more.

In the above exemplary embodiment, the optical system 13+14+15 is constituted of three mirrors. Alternatively, in a third modification H03, the number of mirrors may be arbitrarily changed to, for example, two or fewer, or four or more. Furthermore, for example, the number of optical members provided toward the image capturing component 18 and the number of optical members provided toward the color measurement sensor 27 may be changed, such as disposing an additional mirror only between the third mirror 15 and the first imaging unit 17. Furthermore, although plane reflecting mirrors are described as an example of optical members, the optical members may be alternative reflecting mirrors, such as cylindrical mirrors, spherical mirrors, or parabolic mirrors, or transmissive lenses, such as focusing lenses, in accordance with the shape and the width of the optical path.

Although the second area A2 is disposed inward of the 70%-position in the widthwise direction in the above exemplary embodiment, the second read area A2 may alternatively be disposed outside the 70%-position in a fourth modification H04.

Although the longitudinal direction of the first area A1 and the longitudinal direction of the second area A2 are aligned with each other in the above exemplary embodiment, the longitudinal directions thereof may alternatively intersect at, for example, 90° in a fifth modification H05.

Although the lamps 7 are shared light sources in the above exemplary embodiment, independent light sources may alternatively be disposed in a sixth modification H06. For example, a light source optimized for the image capturing component 18 and a light source optimized for the color measurement sensor 27 may be provided separately from each other. Furthermore, the number of lamps 7 is not limited to two, and may alternatively be one, or three or more. Moreover, the installation angle of each lamp 7 may alternatively be set to an angle other than 45°.

In the above exemplary embodiment, the color measurement sensor 27 is disposed outside the optical path of the light 19 measured by the image capturing component 18. Alternatively, in a seventh modification H07, for example, a beam splitter may be disposed between an imaging lens and the image capturing component 18 so that beams are distributed to the image capturing component 18 and the color measurement sensor 27, thereby performing the measurement processes using a single imaging lens. In other words, the imaging lens may also be shared between the image capturing process and the color measurement process.

In the above exemplary embodiment, the color measurement unit 21 is disposed close to the third mirror 15 so as to shorten the optical path. Alternatively, in an eighth modification H08, the color measurement unit 21 may be disposed at the same position as the image capturing component 18 or at a position farther away from the third mirror 15 than the image capturing component 18.

In the above exemplary embodiment, the cover 22, the hoods 17b and 23, the aperture 26, and the like are provided as light blocking members. Alternatively, in a ninth modification H09, these components may be omitted so as to allow for a reduced number of components.

In the above exemplary embodiment, the tilt angle of the color measurement unit 21 relative to the normal to the recording sheet S is set within 10°. Alternatively, in a tenth modification H010, the color measurement unit 21 may be disposed at a position where it forms an angle greater than or equal to 10°.

In the above exemplary embodiment, the color-calibration chart 32 having the two-dimensionally arranged patches 32a is used. Alternatively, in an eleventh modification H011, a chart that is the same as the derivation chart 31 may be used as the color-calibration chart 32.

In the above exemplary embodiment, the derivation chart 31 is printed by using the marking unit U1*a*. Alternatively, in a twelfth modification H012, a recording sheet with an image whose colors and image position are preliminarily measured may be transported from one of the feed trays TR1 to TR4 so that the image is read by the image reading device Sc without performing an image forming process.

In the above exemplary embodiment, the image reading device Sc is disposed at a position where a recording sheet S having undergone a fixing process, a cooling process, and a decurling process may be read so that an image that is to be actually viewed by the user can be read. Alternatively, in a thirteenth modification H013, the image reading device Sc may be disposed at a freely-chosen position, such as a position immediately downstream of the fixing device F or a position immediately in front of the inversion path or the stacker tray TRh, if allowed by the demanded image quality or the specifications. Instead of disposing the image reading device Sc in the transport path SH, it may also be possible to have the image reading device Sc built inside a document image reader, i.e., a so-called image scanner. In that case, a recording sheet S having the charts 31 and 32 printed thereon may be read while being transported, or may be read in a fixed state. Although the image capturing component 18 and the color measurement sensor 27 may be disposed at the same read position 6, it is also possible that the image capturing component 18 and the color measurement sensor 27 perform their measurement processes at different positions on the transport path SH. Furthermore, instead of being disposed on the transport path SH, the image capturing component 18 and the color measurement sensor 27 may alternatively be disposed in a document reading device, that is, a so-called scanner.

In the above exemplary embodiment, the image reading device Sc is used for performing color calibration in the image forming apparatus. Alternatively, in a fourteenth modification H014, for example, the exemplary embodiment may be applied to an inspection device that is independent of the image forming apparatus and that inspects the colors of a printed material. Specifically, the derivation chart 31 shown in FIG. 10A may be read in advance by the image reading device Sc according to the exemplary embodiment of the present invention, and associating data to be used by an image inspection device may be generated in advance. Then, the chart 32 for color measurement may be printed at the same time as a printed material to be inspected. By performing color measurement using the image reading device Sc according to the exemplary embodiment of the present invention and comparing the obtained result with input color data of the chart 32, the appropriateness of the colors of the printed material may be determined. The chart 32 may be printed during a series of printing processes. For example, if 1,000 sheets are to be printed, the chart 32 is printed for a total of three times, namely, immediately after the start of the printing operation (before printing of the first sheet), after printing of the 500-th sheet, and upon completion of the printing operation (after the 1,000-th sheet). Then, color measurement is performed on the chart 32 by using the image reading device Sc, thereby determining the appropriateness of the colors. The chart 32 may be printed on a sheet different from the printed material, or may be printed on a margin area or a peripheral area of the printed material if such a margin area to be cut off is set in the printed material.

In the above exemplary embodiment, the print image server COM is externally connected to the printer U. Alternatively, in a fifteenth modification H015, the function of the print image server COM, that is, the sections C15 to C18, may entirely be included in the printer U. As another alternative, the function of the print image server COM may be distributed to multiple devices that are electrically connected via a network. In other words, integrated processing may be achieved by integrating the sections C15 to C18 into a single device, or distributed processing may be achieved by distributing the sections C15 to C18 to multiple devices.

In the above exemplary embodiment, the associating data indicates an example of a correspondence relationship between RGB values and $L^*a^*b^*$ values. Alternatively, in a sixteenth modification H016, for example, spectrum values or stimulus values may be used in place of the $L^*a^*b^*$ values. Furthermore, the color system used is not limited to the RGB color system or the $L^*a^*b^*$ color system, and may be a freely-chosen known color system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a first reader member that receives light from a medium so as to read an image recorded on a surface of the medium;
   a second reader member having a spectroscope that separates the light from the medium and reading a color of the image recorded on the surface of the medium on the basis of the separated light;
   a deriving unit that derives associating information that associates a first read result with a second read result on the basis of the first read result and the second read result, the first read result being obtained by the first reader member reading the medium having the image with a predetermined color recorded thereon, the second read result being obtained by the second reader member reading the medium; and
   a measuring unit that, when the color of the image on the medium is to be measured for performing color calibration, measures the color by reading the medium by using the first reader member so as to determine a color corresponding to the second read result on the basis of the first read result and the associating information.

2. The image reading device according to claim 1, wherein a longitudinal direction of a first read area from which the first reader member reads the medium is aligned with a longitudinal direction of a second read area from which the second reader member reads the color.

3. The image reading device according to claim 1, further comprising:
   a light source that radiates light to the medium, the light source being a shared light source that radiates light to be read by the first reader member and the second reader member; and
   a shared optical system that guides the light from the medium to the first reader member and the second reader member.

4. The image reading device according to claim 3,
wherein the second reader member is disposed outside an optical path of the light read by the first reader member,
wherein the image reading device further comprises:
a first imaging member that is disposed on an optical path of the optical system and that focuses the light onto the first reader member so as to form an image of the light thereon; and
a second imaging member that is disposed on the optical path of the optical system at a position that is displaced relative to the first imaging member, the second imaging member focusing the light onto the second reader member so as to form an image of the light thereon.

5. The image reading device according to claim 1,
wherein each of the reader members reads the image on the medium passing through a predetermined read area set on a transport path along which the medium is transported.

6. An image forming apparatus comprising the image reading device according to claim 1.

7. The image forming apparatus according to claim 6, further comprising an image recorder that records the image having the predetermined color onto the medium,
wherein the image reading device according to claim 1 reads the image having the predetermined color recorded by the image recorder at a predetermined position on a transport path of the medium.

8. An image reading method comprising:
performing first reading by receiving light from a medium so as to read an image recorded on a surface of the medium;
performing second reading by separating the light from the medium and reading a color of the image recorded on the surface of the medium on the basis of the separated light;
deriving associating information that associates a first read result with a second read result on the basis of the first read result and the second read result, the first read result being obtained in the first reading in which the medium having the image with a predetermined color recorded thereon is read, the second read result being obtained in the second reading in which the medium is read; and
measuring the color of the image on the medium for performing color calibration by reading the medium in the first reading so as to determine a color corresponding to the second read result on the basis of the first read result and the associating information.

* * * * *